United States Patent [19]

Davies

[11] Patent Number: 4,504,393

[45] Date of Patent: Mar. 12, 1985

[54] METHOD AND APPARATUS FOR CONTROLLING A ROTATING BIOLOGICAL CONTACTOR

[75] Inventor: Bryan T. Davies, San Rafael, Calif.

[73] Assignee: Chevron Research Company, San Francisco, Calif.

[21] Appl. No.: 618,549

[22] Filed: Jun. 8, 1984

[51] Int. Cl.³ .............................................. C02F 3/06
[52] U.S. Cl. ................................... 210/614; 210/619; 210/85; 210/96.1; 210/143; 210/150
[58] Field of Search ............ 210/614, 619, 739, 196.1, 210/113, 85, 86, 143, 145, 150, 151

[56] References Cited

U.S. PATENT DOCUMENTS 3,557,954 1/1971 Welch .............................. 210/619 X
3,596,767 8/1971 Antonie ........................... 210/614 X
4,269,719 5/1981 Yamamota ...................... 210/150 X

FOREIGN PATENT DOCUMENTS

81/03325 11/1981 PCT Int'l Appl. ................ 210/619

Primary Examiner—Thomas Wyse
Attorney, Agent, or Firm—Burns, Doane, Swecker & Mathis

[57] ABSTRACT

A method and apparatus for controlling a rotating biological contactor. The weight of the biomass on the rotating members is monitored so that in the event that materials which are toxic to the biological slime is present in the waste water, the rate of weight loss from the rotating members can be determined and the flow of waste water to the rotating biological contactor can be controlled. To prevent back-up of the system, the waste water may be diverted to a diversion basin.

18 Claims, 2 Drawing Figures

METHOD AND APPARATUS FOR CONTROLLING A ROTATING BIOLOGICAL CONTACTOR

BACKGROUND OF THE INVENTION

1. Field of the Invention

This invention relates to a method and apparatus for controlling a rotating biological contactor in which the rate of weight change is monitored to determine the presence of conditions adverse to the maintenance of biological growth on the contactor.

2. Description of the Prior Art

In biochemical reactions, such as the treatment of waste water, it is known in the art to measure changes in various conditions and to alter treatment of the reaction in response to such changes. Thus, for example, in U.S. Pat. No. 3,684,202, activated sludge is recycled to main sewage aerating tanks based on the measurement of the biological oxygen demand (BOD) of the sewage whereas in U.S. Pat. No. 4,130,481, the recycle is determined by sludge density and $CO_2$ production.

In U.S. Pat. No. 4,183,810, the BOD supply to a final denitrification step is controlled by analysis of the nitrite-plus-nitrate content in the process liquid.

In U.S. Pat. No. 4,276,174, the temperature of an aerated mixture of sludge is sensed and the rate of introducing oxygen-containing gas into the mixture is controlled in response thereto.

In U.S. Pat. No. 4,277,342, sludge influent is treated in an aerated mixing tank wherein the pH and the oxidation reduction potential or dissolved oxygen content is measured and acid and oxygen is respectively supplied in response to the measured levels.

In German Offenlegungsschrift No. 2532199, the activity of microorganisms in a sewage treatment plant is supervised and controlled by the measured oxygen demand at the measured temperature, oxygen concentration and turbidity level. In this system, pH values are kept constant by the metered addition of acid or alkaline solution.

One means of treating waste water is through the use of rotating biological contactors wherein biological slimes on the contactors aerobically digest the organic content in the waste water. Various arrangements incorporating rotating biological contactors are described in U.S. Pat. Nos. 3,484,836, 3,704,783 and 4,130,482. Additionally, U.S. Pat. No. 3,516,929, the inlet for the waste water flow to a plurality of rotating contactors is opened or closed according to the liquid level sensed by probes in the channel in which the contactors are located.

The use of rotating biological contactors provides an efficient and effective manner of treating waste water. Unfortunately, it has been found that the biological slime on the contactors is sensitive to toxic materials whereby the presence of toxic materials in the waste water may destroy the biological slime and render the rotating biological contactors useless for their intended purpose. Conventional sensing devices, such as those described previously, generally are not capable of determining an increase of those toxic materials which will adversely affect the biological slime. Moreover, even if sensing devices for the toxic materials could be developed, the necessary level of sensitivity would by difficult to achieve. In this regard, the constant contact with the waste water would tend to corrode or foul the sensing device thereby preventing its operation or affecting its sensitivity.

OBJECTS AND SUMMARY OF THE INVENTION

Accordingly, it is a general object of the present invention to provide a method and apparatus which overcomes or substantially alleviates the problems of the prior art.

It is a more specific object of the present invention to provide a method and apparatus for controlling a rotating biological contactor to reduce the effect of toxic materials on the biological slime on the contactor.

Is is a further object of the present invention to provide a method and apparatus for controlling a rotating biological contactor in which the sensing means does not contact the waste water.

It is a still further object of the present invention to provide a method and apparatus for controlling a rotating biological contactor in which the rate of weight change of the biological slime is measured and, in response to a relatively rapid decrease in weight, the waste water flow to the contactor is controlled.

In accordance with one aspect, the present invention provides a method for controlling a rotating biological contactor which includes at least one rotating member having a biomass of biological slime. The method comprises:

(a) passing waste water to the rotating biological contactor thereby establishing a normal weight of the biomass on said at least one rotating member;

(b) monitoring the weight of the biomass on said at least one rotating member; and (c) in response to a rate of weight loss greater than a predetermined rate, controlling the passage of the waste water to the rotating biological contactor.

In accordance with another aspect, the present invention provides an apparatus for controlling a rotating biological contactor. The apparatus comprises:

(a) a vessel having a liquid inlet for waste water and a liquid outlet;

(b) liquid flow control means connected to the liquid inlet;

(c) at least one rotating member having a biomass of biological slime thereon located in the vessel and connected to a rotating shaft;

(d) means for sensing the weight of the biomass; and (e) controller means operably connected to the weight sensing means and the liquid flow control means wherein upon the occurrence of a rate of decrease of the weight of the biomass greater than a predetermined rate, the flow of the waste water to the vessel is controlled.

Further advantages and features of the invention as well as the scope, nature and utilization of the invention, will become apparent to those skilled in the art from the following detailed description of the preferred embodiments of the invention.

DETAILED DESCRIPTION OF THE PREFERRED EMBODIMENTS

Figure 1:
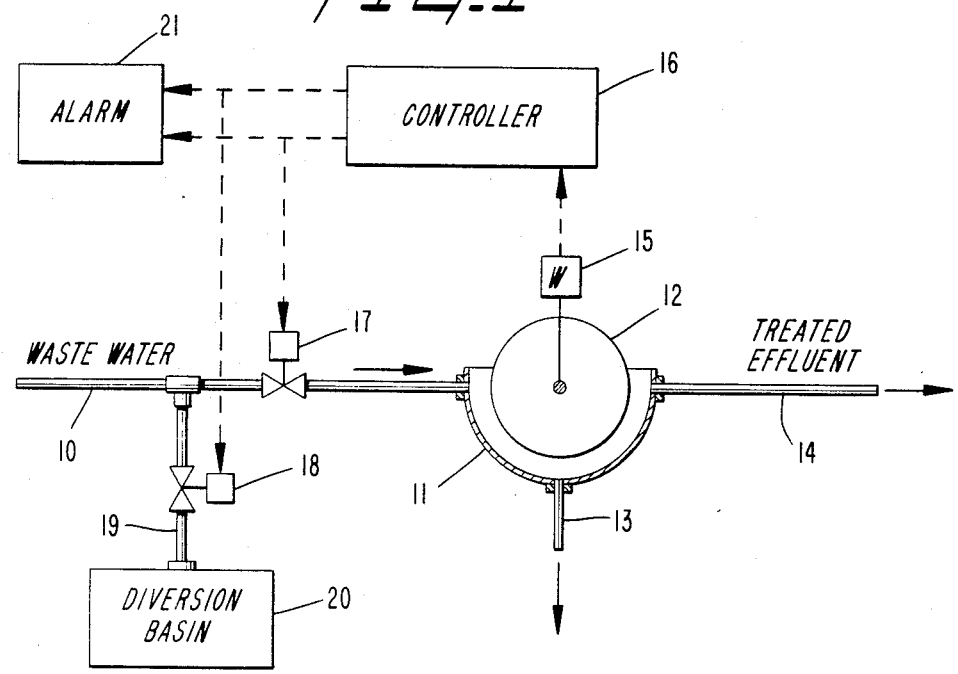
FIG. 1 is a diagram showing a rotating biological contactor and a control system in accordance with various aspects of the present invention.

As stated herein above, the present invention relates to a method and apparatus for controlling a rotating biological contactor. Rotating biological contactors, per se, are well known in the art as demonstrated by aforementioned U.S. Pat. Nos. 3,484,836, 3,516,929, 3,704,783 and 4,130,482, the contents of which are incorporated by reference.

The rotating biological contactor is typically comprised of a vessel having a liquid inlet and a liquid outlet with at least one rotating member located in the vessel. The rotating member may be of any general shape, but is usually a series of disks mounted on a shaft which extends transverse to the direction of waste water flow from the liquid inlet to the liquid outlet. The rotating members are coated with a biomass of biological slime such that they come into alternate contact with the waste water to be treated and gaseous oxygen. The source of gaseous oxygen may be the ambient atmosphere or may be an oxygen-enriched atmosphere in which case the rotating members would be located in an enclosed vessel.

The biological slime on the rotating members is principally composed of aerobic bacteria which have the ability to adsorb, absorb, coagulate and oxidize various organic constituents in the waste water and to change such constituents into unobjectionable forms of matter. At the same time, the biological slime increases the transfer of oxygen to the waste water thereby promoting the multiplication or synthesis of the aerobic bacteria already present in the waste water and in the biological slime on the rotating members, as well as increasing the ability of the aerobic bacteria to act upon the waste water and reduce it to unobjectionable forms.

Under normal operating conditions, the amount of the biological slime on the rotating members approximates steady state. That is, as older bacteria die, they are sloughed off the rotating members and are replaced by new aerobic bacteria propagating under the aerobic conditions of the biological contactor. The effectiveness of the rotating biological contactor depends solely on the ability of the aerobic bacteria to treat the organic contaminants in the waste water and render them unobjectionable. Of course, the amount of bacteria on the biological contactor will vary over a period of days depending on the concentration of biodegradable material in the waste water.

Unfortunately, the aerobic bacteria are sensitive to the presence of herbicides, pesticides and other types of toxic materials. Although the aerobic bacteria may be able to withstand a certain level of the toxic material depending on the species of aerobic bacteria present in the biological slime and the particular toxic material, beyond that level the aerobic bacteria will die and the rotating biological contactor will no longer be effective in treating waste water.

The present invention meets the stated problem by controlling the flow of the waste water to the rotating biological contactor whereby the aerobic bacteria in the biological slime is not unduly adversely affected. The invention may be appreciated by referring to an illustrative embodiment of the invention shown in FIG. 1. In the drawing, waste water flows through line 10 and enters vessel 11 containing rotating member 12. The waste water passing through line 10 may be untreated or may be previously treated by gross filtration, commination, floatation or other physical or chemical-physical pretreatment processes. On the rotating member is a biomass of biological slime containing aerobic bacteria. The bacteria adsorbs, absorbs, coagulates and oxidizes the organic contaminants in the waste water. Vessel 11 may be equipped with a lower outlet 13 for removing heavier materials accumulating at the bottom of the vessel or for draining the vessel. The vessel may also be equipped with a cover (not shown) in the event that an oxygen-enriched atmosphere is to be employed. Treated effluent leaves the vessel through line 14 and may be subsequently treated with a further rotating biological contactor and/or other conventional waste water treating steps (not shown).

Operably connected to the rotating member is a weight sensor 15 which sends a signal indicative of the weight of the rotating member and the biomass located thereon to controller 16. The weight sensor may be of the type known in the art which has been used for highway weighing stations and reaction vessels, hoppers, vats, blenders and tanks. One acceptable type of weight sensor is a load cell having a bonded strain gage bridge and related circuit components enclosed in a hermetically sealed housing which is available from Revere Corporation of America (a division of Neptune Meter Company) located in Wallingford, Conn.

Controller 16 may be any known analog or digital computer which is capable of receiving signals from weight sensor 15, calculating a rate of change of the weight of the rotating member, comparing the weight to a programmed, predetermined negative rate and, upon determining that the calculated rate exceeds the programmed predetermined negative rate, transmits a signal. The signal is used to control valve 17 which will restrict or terminate the flow of waste water through line 10. Controller 16 can also be selected so as to transmit a further signal to valve 18 whereby the flow of waste water through line 10 is diverted through line 19 and into diversion basin 20. The signals may also be used to trigger an indicator, such as alarm 21, or otherwise signal the condition of the apparatus.

Figure 2:
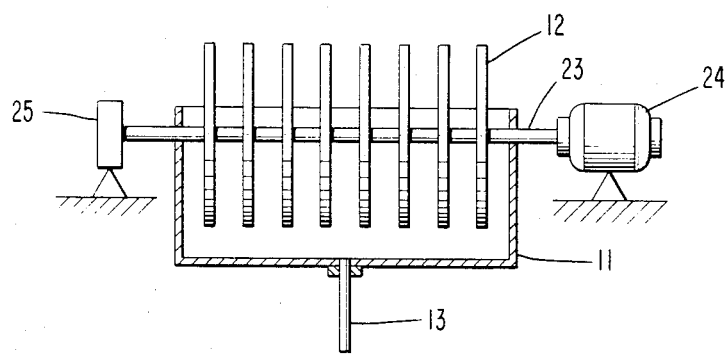
FIG. 2 is an end view of a rotating biological contactor showing various suitable locations for the weight sensing means.

As shown in FIG. 2 wherein the same reference numerals refer to the elements previously identified with respect to FIG. 1, vessel 11 contains a plurality of rotating members, such as the one indicated by reference numeral 12, which are connected to rotating shaft 23. While the drawing shows a single shaft with a plurality of rotating members, it is apparent that the vessel could contain a plurality of rotating shaft with associated rotating members. In such an embodiment, the weight of the biomass on at least the rotating members closest to the inlet should be monitored since this biomass would presumedly be first affected by the presence of toxic materials in the waste water. The shaft is driven by a variable speed motor 24 and is supported at the opposite end by bushing 25. At any of the points indicated by the triangles, one or more weight sensors may be positioned. More specifically, the weight sensor may be located under the variable speed motor, under the end bushing or under whatsoever bearings or bushings are used to support the rotating shaft. Of course, the shaft should pass through the sides of vessel 11 such that the measurement of the vertical deflection of the shaft is not impaired. As illustrated in the figure, this may typically be achieved by supporting the weight sensors with a fixed foundation. By locating the weight sensor at at least one of these locations, the weight of the rotating member having the biomass thereon can be measured by the weight sensor and a signal passed to controller 16. This arrangement permits the condition of the biomass to be measured accurately without the necessity of a sensor contacting the waste water.

In operation, waste water passes through line 10 into vessel 11 wherein it is contacted with the biomass located on rotating members 12. The dimensions of the vessel and the number and size of the rotating members will be determined based on the amount and degree of contamination of the waste water. However, a typical vessel may be from about 5 to about 15 feet wide, from about 5 to about 30 feet long and from about 3 to about 10 feet deep. The vessel typically contains from about 5 to about 400 rotating members of disk-like shape each being from about 5 to about 15 feet in diameter with the rotational rate of the rotating members varying from about 1 to about 5 rpm. An illustrative arrangement is a vessel having a width of 14 feet, a length of 26 feet and a depth of 7 feet with one shaft rotating at 1.5 rpm and having 400 rotating members each 12 feet in diameter. Thus, in this arrangement, the edges of each rotating member has about a one foot clearance to the sides of the vessel.

The organic contaminants in the waste water are adsorbed, absorbed, coagulated and oxidized into unobjectionable forms of matter and the treated effluent passes from the vessel via line 14 for recovery or further treatment. Sludge accumulating in the vessel may be removed by opening the valve in line 13.

The weight of the rotating member including the biological slime is measured by weight sensor 15 and a signal is transmitted to controller 16. By measuring the weight of the rotating member or members when there is no biological slime thereon and further measuring the member or members when the contactor is operating normally, the total quantity of the biomass may be determined. In the event that measurements from the weight sensor indicate that from about 5 to about 50 percent, preferably from about 10 to about 20 percent by weight of the biomass has been sloughed off the rotating members within from about 1 to about 100 minutes, preferably from about 5 to about 20 minutes, the controller reacts by restricting or terminating flow through valve 17. The precise weight loss and time period for a particular biological contactor is determined according to such factors as the flow rate of the waste water, the quantity of biodegradable matter in the waste water and the type of toxic wastes expected to be encountered.

In addition to controlling the flow to the contactor, the controller 16 may also open valve 18 whereby wastewater is diverted through line 19 into diversion basement 20. Additionally, the controller may signal the operator by indicating the weight loss and by showing the positions of valves 17 and 18.

Modifications of the above-described embodiments of the invention that are obvious to those of ordinary skill in the waste water art or related art are intended to be within the scope of the following claims.

What is claimed is:

1. A method of controlling a rotating biological contactor which includes at least one rotating member having a biomass of biological slime, said method comprising:
    (a) passing waste water to the rotating biological contactor thereby establishing a normal weight of the biomass on said at least one rotating member;
    (b) monitoring the weight of the biomass on said at least one rotating member; and
    (c) in response to a rate of weight loss greater than a predetermined rate, controlling the passage of the waste water to the rotating biological contactor.

2. The method of claim 1 wherein the predetermined rate of weight loss is in the range of from about 5 to about 50 percent by weight of the biomass over from about 1 to about 100 minutes.

3. The method of claim 1 wherein the rotating biological contactor includes a plurality of rotating members located on a common rotating shaft.

4. The method of claim 3 wherein the weight of the biomass is monitored by monitoring the weight of the shaft.

5. The method of claim 1 wherein the passage of waste water to the rotating biological contactor is controlled by terminating the flow of waste water to the contactor.

6. The method of claim 5 wherein the passage of the waste water is further controlled by diverting the waste water to a diversion basin.

7. The method of claim 1 wherein the predetermined rate of weight loss is in the range of from about 10 to about 20 percent by weight of the biomass over from about 5 to about 20 minutes.

8. An apparatus for controlling a rotating biological contactor comprising:
    (a) a vessel having a liquid inlet for waste water and a liquid outlet;
    (b) liquid flow control means connected to the liquid inlet;
    (c) at least one rotating member having a biomass of biological slime thereon located in the vessel and connected to a rotating shaft;
    (d) means for sensing the weight of the biomass; and
    (e) controller means operably connected to the weight sensing means and the liquid flow control means wherein upon the occurrence of a rate of decrease of the weight of the biomass greater than a predetermined rate, the flow of the waste water to the vessel is controlled.

9. The apparatus of claim 8 wherein the rotating biological contactor includes a plurality of rotating members on the rotating shaft.

10. The apparatus of claim 9 wherein the weight sensing means senses the weight of the rotating shaft.

11. The apparatus of claim 9 wherein the rotating shaft is driven by a variable speed motor and the weight sensing means senses the weight of the motor.

12. The apparatus of claim 9 wherein the rotating shaft has a bushing at one end and the weight sensing means senses the weight of the bushing.

13. The apparatus of claim 8 wherein the controller means is further operably connected to a second liquid control means whereby waste water may be diverted from the vessel to a diversion basin.

14. The apparatus of claim 8 wherein the controller means is connected to an indicator means.

15. The apparatus of claim 8 wherein the controller means is connected to an alarm.

16. The apparatus of claim 8 wherein the vessel contains a plurality of rotating members on a plurality of rotating shafts.

17. The apparatus of claim 8 wherein the controller means controls the flow of waste water to the vessel when the sensing means senses a weight loss of from about 5 to about 50 percent by weight over from about 1 to about 100 minutes.

18. The apparatus of claim 8 wherein the controller means controls the flow of waste water to the vessel when the sensing means senses a weight loss of from about 10 to about 20 percent by weight over from about 5 to about 20 minutes.

* * * * *